Oct. 3, 1967   E. J. SAXL   3,344,664
TENSION METER
Filed April 8, 1965

Inventor:
Erwin J. Saxl,
by Arthur D. Thomson
Attorney

United States Patent Office 3,344,66[4]
Patented Oct. 3, 196[7]

3,344,664
TENSION METER
Erwin J. Saxl, Harvard, Mass., assignor to Tensitron, Inc., Harvard, Mass., a corporation of Massachusetts
Filed Apr. 8, 1965, Ser. No. 446,689
3 Claims. (Cl. 73—144)

ABSTRACT OF THE DISCLOSURE

A tension meter for measuring tension in a filament. The meter has a central roll which engages the filament on one side, and a pair of rolls which engage the filament on the other side. The central roll is connected to an indicating mechanism. The pair of rolls is mounted on a swinging arm controlled by a lever and linkage by which the arm can be swung to an open position for inserting the filament and a closed position for measurement.

---

This invention relates to meters for measuring tension in filamentary materials, such as yarn or wire, and pertains more particularly to portable meters for measuring tension in relatively heavy cables. This application is a continuation-in-part of my previous application Ser. No. 36,064, filed June 14, 1960, now Patent No. 3,177,708.

The type of tension meter to which this invention pertains employs three rollers arranged in a row which engage the filament in such a way that the center roller deflects the filament from a straight path. The center roller is movable transversely of the filament and is connected to a detecting mechanism which measures the force exerted on the center roller due to tension in the filament. The two outer rollers are connected to an inserting linkage by which they may be moved transversely away from the center roller to facilitate insertion of the filament.

This invention is concerned particularly with the inserting mechanism of such a meter, and the principal object is to provide an inserting mechanism which allows for substantial travel of the outer roller so that the meter may be easily installed on heavy cables, and which locks the rollers securely in the operating position. Another object is to provide a tension meter which is simple, rugged and compact and which can be safely used on either running or stationary cables, wires and other filamentary materials.

The meter here described includes a base plate on which the center roller and its associated detecting mechanism are mounted. The outer rollers are mounted on an arm which is pivoted at one end on the base plate and connected at the other end to a link. The link extends along one side of the base plate and is connected to a lever, also pivoted on the base plate. By swinging the lever in one direction the arm is swung away from the center roller, so that the cable or filament may be inserted between the rollers. The lever is swung in the opposite direction to seat against a stop on the base plate, and carries the link past a dead center position so that the outer rollers are locked in the correct operating position.

Other objects, advantages, and novel features of the invention will be apparent from the following description.

Figure 1:
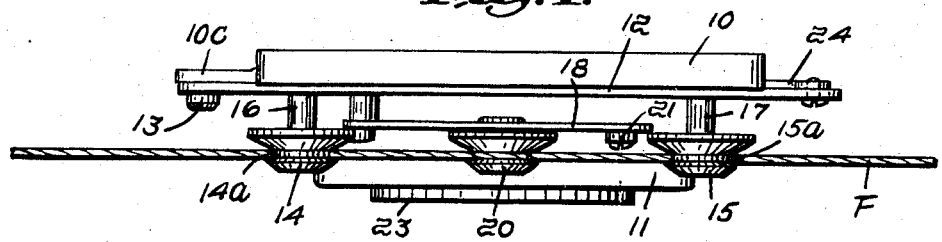
Figure 2:
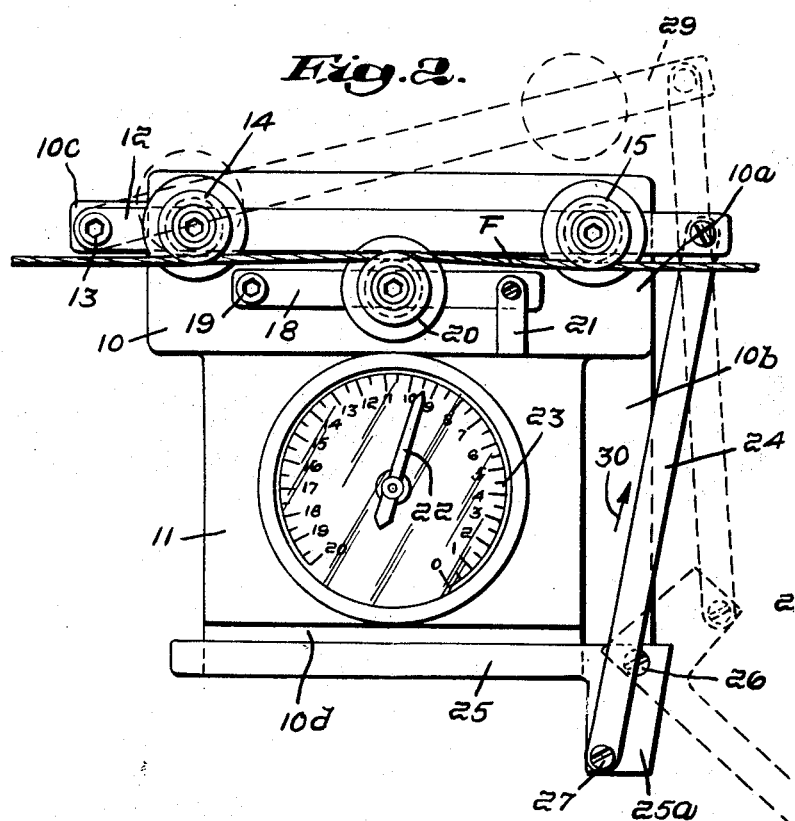
Figure 3:
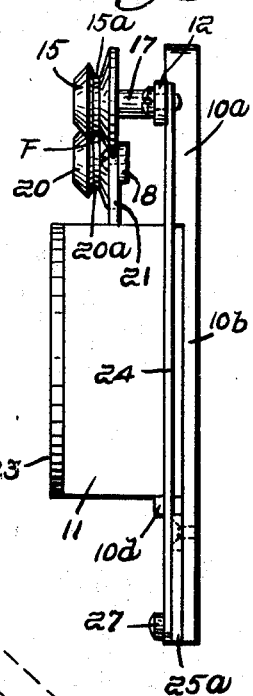

In the drawings illustrating the invention:
FIG. 1 is a top plan view of a tension meter constructed according to the invention;
FIG. 2 is a front elevation of the tension meter; and
FIG. 3 is a right side elevation of the tension meter.

The various parts of the tension meter are mounted on a base plate 10 having an upper portion 10a, and a side portion 10b of reduced thickness. The base plate carries a housing 11 which may be cast in one piece with the plate or may be a separate piece. The base plate has an extension 10c at the left hand upper corner, on which an arm 12 is pivoted at 13. A pair of filament engaging rollers 14 and 15, referred to as the "outer" rollers are rotatably supported on shafts 16 and 17, respectively mounted on arm 12.

A second arm 18 is pivoted at 19 on portion 10a, and carries a rotatable roller 20, referred to as the "center" roller. When the meter is in use, the filament F passes between the center roller and the two outer rollers as illustrated. The outer rollers are equidistant from the center roller in the longitudinal direction of the filament.

All the rollers have filament receiving grooves 14a, 15a and 20a, respectively, the rollers are positioned when in operating position, so that the upper portion of groove 20a and the lower portion of grooves 14a and 15a are spaced, transversely of the filament path, by less than the thickness of the filament, so that the filament is deflected from a straight line. Tension applied to the filament tends to straighten it, thus applying to roller 20 a force in the direction perpendicular to the filament, which is proportionate to the tension.

The arm 19 is connected by a link to a detecting mechanism (not shown) which transforms movement of roller 20 in a direction transverse to the filament, into rotary movement of a pointer 22 over a calibrated dial 23. The detecting mechanism may be that shown in my aforesaid application Ser. No. 36,064, or any other device suitable for the purpose.

The free right end of arm 12 is connected to a link 24 which passes freely over the reduced portion 10b of the base plate. A hand lever 25 is pivoted at 26 on the lower right hand corner of the base plate and has a downward extension 25a to which the lower end of link 24 is rotatably connected at 27. The lever, when in closed position, engages a step 10d on the base plate, which serves as a stop.

To insert a filament between the rollers, the lever 25 is swung counter clockwise, for example to the position shown by the dotted outline 28. This movement, transmitted through link 24, swings arm 12 to the position indicated by the dotted outline 29, carrying rollers 14 and 15 away from the center roller. The meter is conveniently applied to a filament by placing arm 12, in its open position, parallel to the filament, and engaging the two outer rollers. At this angle, there is a sizable transverse opening between rollers 14 and 20, as well as between rollers 15 and 20, so that a relatively thick cable can be easily inserted.

To measure tension in the filament, lever 25 is swung back to the operating position shown in full line in FIG. 2. This brings the rollers 14 and 15 back to operating position. It will be noted that the connection point 27 between link 24 and the lever, is to the left of the fulcrum point 26 of the lever, that is, passes beyond the dead center position. The instrument is then locked onto the filament and cannot be accidentally dislodged. Increasing tension on the cable, resulting in increasing pull on link 24 in the direction of arrow 30, serves to lock the instrument more tightly.

The instrument can be used on either stationary or running filament. The placement of the hand lever on the end of the base plate opposite that on which the rollers are mounted, allows the instrument to be installed on, and removed from, rapidly running filaments without danger to the operator. The inserting mechanism, when moved past dead center toward the closed position, automatically brings the outer rollers to the operating position with respect to the center roller for which the meter is designed and calibrated.

It is understood that the meter may be made in various sizes and the detecting mechanism may be designed for various tension ranges. The rollers, also, may be replaced by other types of filament engaging elements, such as stationary pins, or elongated rolls for use on tape or sheet material.

What is claimed is:

1. A tension meter comprising a base; a first filament engaging element movably mounted on said base; means connected to said first element for indicating its movement; an arm having one end connected to said base and the other end free; said arm being swingable toward and away from said first element; a second and a third filament engaging element mounted on said arm one to either side of said first element, said filament engaging elements being adapted to engage a filament with said first element and said second and third elements disposed on opposite sides of the filament; means resiliently urging said first element in a direction to deflect from a straight path a filament engaged by said elements; a link connected to the free end of said arm; and a lever disposed to fulcrum on said base and connected to said link, said lever and link being swingable between a closed position, in which said second and third filament engaging elements are in operative relationship to said first element, and an open position in which said arm is swung away from said first element.

2. A tension meter as described in claim 1, said lever being disposed to fulcrum on said base remotely from said filament engaging elements.

3. A tension meter as described in claim 1, said base carrying a stop engageable with said lever in said closed position.

References Cited

UNITED STATES PATENTS 3,177,708    4/1965    Saxl _____ 73—144

FOREIGN PATENTS 729,979    5/1955    Great Britain.

RICHARD C. QUEISSER, *Primary Examiner.*

JAMES J. GILL, *Examiner.*

C. A. RUEHL, *Assistant Examiner.*